US008275865B2

(12) United States Patent
Uthe

(10) Patent No.: US 8,275,865 B2
(45) Date of Patent: Sep. 25, 2012

(54) METHODS, SYSTEMS AND COMPUTER PROGRAM PRODUCTS FOR SELECTING AMONG ALERT CONDITIONS FOR RESOURCE MANAGEMENT SYSTEMS

(75) Inventor: Robert Thomas Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 2984 days.

(21) Appl. No.: 10/772,881

(22) Filed: Feb. 5, 2004

(65) Prior Publication Data

US 2005/0198640 A1  Sep. 8, 2005

(51) Int. Cl.
G06F 15/173 (2006.01)
G06F 15/16 (2006.01)
G06F 15/177 (2006.01)

(52) U.S. Cl. ........ 709/223; 709/217; 709/220; 709/248; 709/249

(58) Field of Classification Search .................. 709/223, 709/217, 220, 248, 249
See application file for complete search history.

(56) References Cited

U.S. PATENT DOCUMENTS

| | | | | | |
|---|---|---|---|---|---|
| 4,937,743 | A | * | 6/1990 | Rassman et al. ................... | 705/8 |
| 5,109,486 | A | * | 4/1992 | Seymour ...................... | 709/224 |
| 5,367,670 | A | * | 11/1994 | Ward et al. ....................... | 714/47 |
| 5,369,570 | A | * | 11/1994 | Parad ............................... | 705/8 |
| 5,528,759 | A | * | 6/1996 | Moore ........................... | 709/224 |
| 5,666,486 | A | * | 9/1997 | Alfieri et al. .................. | 709/223 |
| 5,729,688 | A | * | 3/1998 | Kim et al. ...................... | 709/226 |
| 5,862,333 | A | * | 1/1999 | Graf ............................... | 709/223 |
| 5,935,218 | A | * | 8/1999 | Beyda et al. ................... | 709/251 |
| 6,046,980 | A | * | 4/2000 | Packer ........................... | 370/230 |
| 6,047,322 | A | * | 4/2000 | Vaid et al. ...................... | 709/224 |
| 6,052,722 | A | * | 4/2000 | Taghadoss ..................... | 709/224 |
| 6,125,390 | A | * | 9/2000 | Touboul ......................... | 709/223 |
| 6,154,787 | A | * | 11/2000 | Urevig et al. ....................... | 710/8 |
| 6,233,645 | B1 | * | 5/2001 | Chrysos et al. ............... | 710/244 |
| 6,263,359 | B1 | | 7/2001 | Fong et al. .................... | 709/103 |
| 6,272,544 | B1 | | 8/2001 | Mullen ......................... | 709/226 |
| 6,327,630 | B1 | | 12/2001 | Carroll et al. ................. | 709/314 |
| 6,341,303 | B1 | | 1/2002 | Rhee et al. ..................... | 709/104 |
| 6,353,616 | B1 | | 3/2002 | Elwalid et al. ................ | 370/443 |
| 6,363,411 | B1 | * | 3/2002 | Dugan et al. .................. | 709/202 |
| 6,408,277 | B1 | | 6/2002 | Nelken ............................. | 705/9 |
| 6,425,006 | B1 | * | 7/2002 | Chari et al. .................... | 709/224 |
| 6,430,592 | B1 | | 8/2002 | Davison ........................ | 709/103 |
| 6,446,134 | B1 | * | 9/2002 | Nakamura .................... | 719/313 |
| 6,643,367 | B1 | * | 11/2003 | White-Hauser ............... | 379/269 |
| 7,047,292 | B1 | * | 5/2006 | Stewart et al. ................ | 709/224 |
| 7,216,163 | B2 | * | 5/2007 | Sinn ............................... | 709/224 |
| 7,225,250 | B1 | * | 5/2007 | Harrop .......................... | 709/224 |
| 2002/0138571 | A1 | | 9/2002 | Trinon et al. ................. | 709/204 |
| 2002/0144147 | A1 | * | 10/2002 | Basson et al. ................. | 713/201 |
| 2003/0061265 | A1 | | 3/2003 | Maso et al. .................... | 709/105 |
| 2003/0079030 | A1 | | 4/2003 | Cocotis et al. ................ | 709/229 |
| 2003/0177176 | A1 | * | 9/2003 | Hirschfeld et al. ........... | 709/203 |
| 2003/0191989 | A1 | | 10/2003 | O'Sullivan ..................... | 714/47 |

* cited by examiner

*Primary Examiner* — Krista Zele
*Assistant Examiner* — Tariq Najee-Ullah

(57) ABSTRACT

Methods, systems, and computer program products for selecting among a plurality of alert conditions for processing by a resource management system. A priority indication is associated with at least some resources in a computer system. Resources that are associated with the alert conditions are identified. An alert condition is selected from among the alert conditions based on the priority indication that is associated with the identified resources.

3 Claims, 3 Drawing Sheets

# METHODS, SYSTEMS AND COMPUTER PROGRAM PRODUCTS FOR SELECTING AMONG ALERT CONDITIONS FOR RESOURCE MANAGEMENT SYSTEMS

FIELD OF THE INVENTION

The present invention relates generally to computer systems, and more particularly, to methods, systems and computer program products that manage resources in computer systems.

BACKGROUND OF THE INVENTION

A computer system can include physical and logical system resources (e.g., computers, servers and networks), and these physical and logical resources may in turn host many software resources, which in turn may host more dependent software resources. Resource management systems can monitor some or all of these resources for situations that require corrective action.

A resource management system may include a collection of rules that determines under what situations corrective action should be initiated and the type of corrective action to apply in a particular situation. Some resource management systems extract metrics (data) at specified time intervals from resources that are being monitored, process those metrics, and use processing logic to identify the occurrence of a condition (an "alert condition") that may require corrective action by a user and/or by self-corrective procedures.

The effectiveness of a resource management system can depend on its ability to properly identify alert conditions and notify a user and/or take self-corrective actions.

SUMMARY OF THE INVENTION

Various embodiments of the present invention provide methods, systems, and/or computer program products for selecting among a plurality of alert conditions for processing by a resource management system. A priority indication is associated with at least some resources in a computer system. Resources that are associated with the alert conditions are identified. An alert condition is selected from among the alert conditions based on the priority indication that is associated with the identified resources.

In some further embodiments of the present invention, the resources are prioritized based on their importance to operation of a business, based on an affect of their failure on other resources in the computer system, and/or based on whether a resource is a server of information for predetermined software applications in the computer system. A user may be notified of the selected alert condition and/or corrective action may be initiated for the selected alert condition. The alert conditions may be displayed to a user and/or corrective actions may be taken based on the priority indication associated with the identified resources.

DETAILED DESCRIPTION

Figure 1:
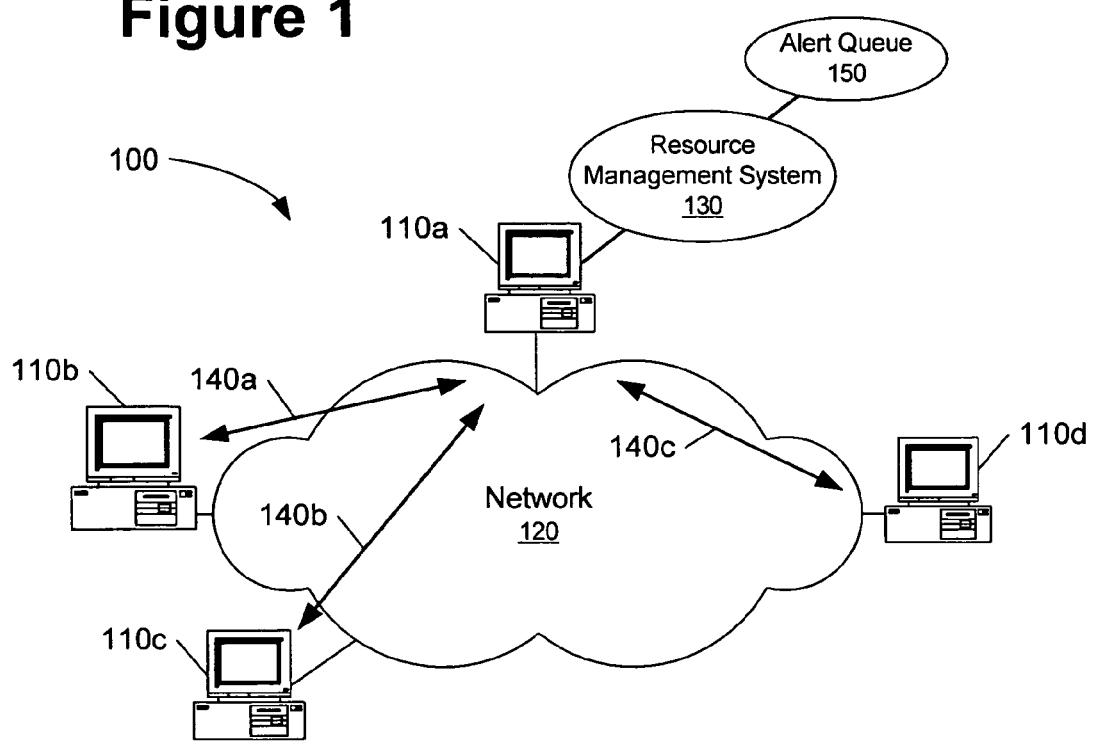
FIG. 1 is a block diagram of a computer system including a resource management system according to various embodiments of the present invention.

The present invention will now be described more fully with reference to the accompanying drawings, in which embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

As will be appreciated by one of skill in the art, the present invention may be embodied as methods, computer systems, or computer program products. Accordingly, the present invention may take the form of entirely software embodiments or embodiments combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++ and/or using a conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. In some alternate embodiments of the invention, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 illustrates a computer system 100 that manages resources according to various embodiments of the present invention. The computer system 100 includes four computers 110a-d that are interconnected by a network 120. The computers 110a-d and the network 120 can host various hardware and software components, including operating system(s), application programs, input/output device drivers, and data. The computers 110a-d and network 120 and the hardware and software components therein are referred to herein as "resources".

According to some embodiments of the present invention, the computer 110a includes a resource management system 130 that manages at least some resources in the computers 110a-d and/or the network 120. The resources are monitored based on, for example, their performance, availability, and/or operation, to identify conditions for which corrective action may be needed by a user and/or by the resource management system 130. When such conditions are identified, an alert condition is communicated to the resource management system 130 in the computer 110a. Exemplary alert condition communications 140a-c are illustrated in FIG. 1. The resource management system 130 may notify a user that corrective action may need to be taken and/or it may initiate procedures for taking corrective action. The resource management system 130 retains the alert conditions in an alert queue 150 until the resource management system is able to analyze each one to interpret the condition it is reporting, and has initiated procedures for corrective action. Corrective actions may include reinitializing the network 120 and/or the computers 110a-d, and/or may include reconfiguring, terminating and/or reinitializing individual hardware and/or software applications that are associated with the alert condition, or reconfiguring hardware and/or software applications to failover to backup systems.

Although only four computers 110a-d and one network 120 are shown in FIG. 1 for illustration purposes, it is to be understood that a computer system may comprise hundreds of thousands of computers and hundreds of networks. Moreover, each computer may comprise, for example, tens or hundreds of hardware and software resources that are managed by the resource management system 130. Accordingly, when significant outages occur the resource management system 130 may have hundreds or thousands of alert conditions in the queue 150 awaiting processing by the system. When the system cannot processing the incoming alerts fast enough, for example due to an "event storm" or due to inadequately sized resources for the resource management system itself, the queue will grow, lengthening the time it takes to process a given alert. In these stress conditions alerts identifying a failure with a critical resource would, but for embodiments of the present invention, not be processed until the ones ahead of it in the queue are handled.

According to some embodiments of the present invention, the resource management system 130 associates a priority indication with at least some resources in the computer system 100. The resources that are associated with the alert conditions in the queue 150 are identified. For example, the resource may be directly identified from information that is included in the alert condition communications 140a-c which identifies their sources, and/or may be indirectly identified based on characteristics of the alert condition. For example, a resource may be identified based on an analysis of which resources in the computer system 100 can cause the alert condition (e.g., based on notice that the network 120 has a low effective bandwidth or high error rate or that one of the computers 110b-d or application(s) thereon is non-responsive). The resource management system 130 then selects an alert condition from among the alert conditions in the queue 150 based on the priority indication that is associated with the identified resources. The selected alert condition may then be prioritized over at least some of the other alert conditions for response. The alert conditions in the queue 150 may thereby be prioritized relative to each other when the resource management system 130 is fetching the next alert to process.

The priority indication for a resource may be based on, for example, its relative importance to certain business operations, the affect of its failure on other resources in the computer system 100, whether it is associated with a server of information for other resources (e.g., a server for predefined computers and/or software applications), and/or based on other attributes of the resource. The priority indication may be predefined by a user and/or it may be assigned by the resource management system 130. Thus, for example, software/hardware resources that are needed for receiving new product orders or handling customer inquiries can have a priority indication that causes the resource management system 130 to prioritize alert conditions associated with those resources higher than other alert conditions. For example, when hardware and/or software resources are dynamically provisioned to enable on-demand balancing to achieve business' goals, the priorities of the re-provisioned resources can be reset based upon the priorities of the business goal.

Figure 2:
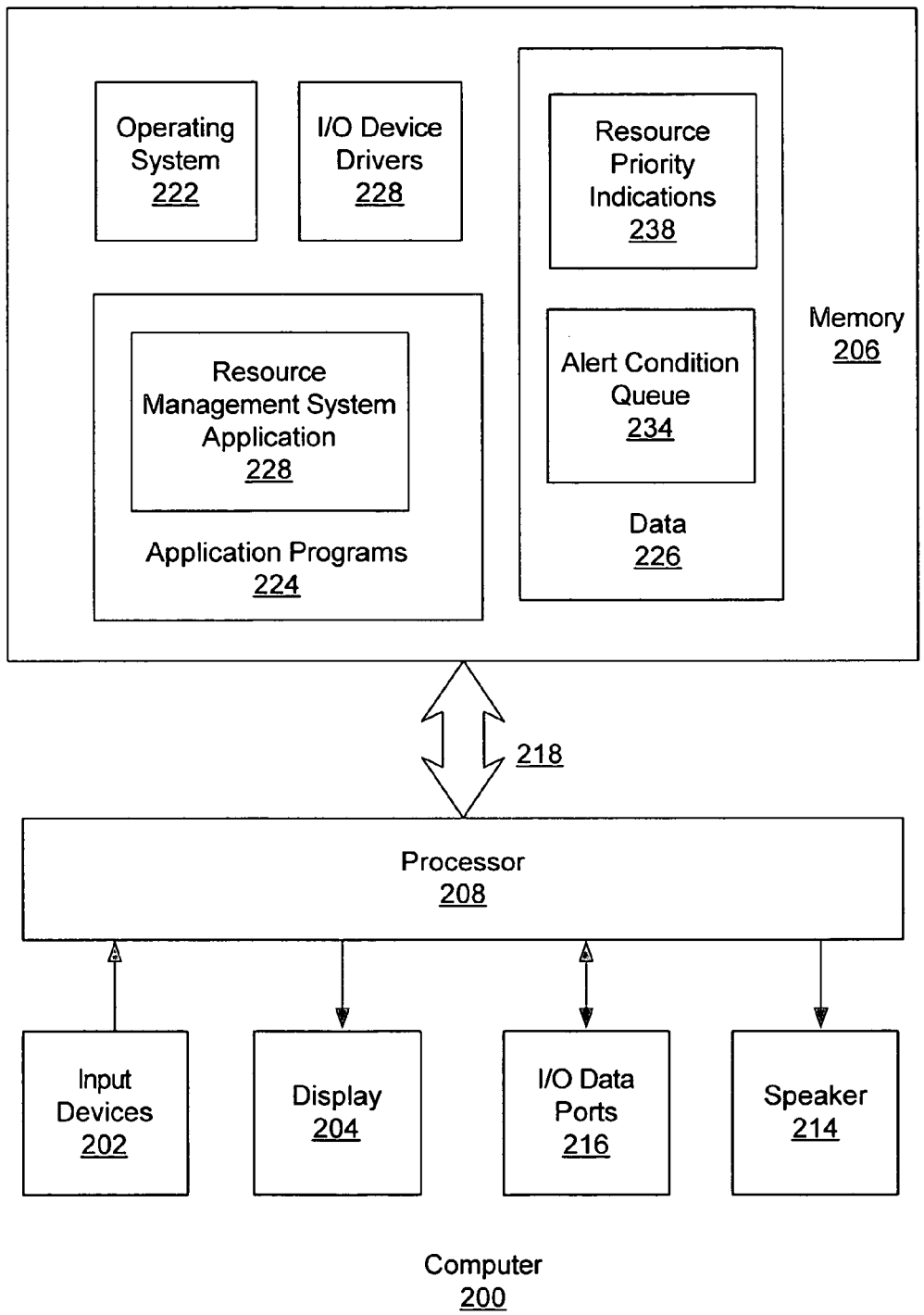
FIG. 2 is a block diagram of a computer according to some embodiments of the present invention.

FIG. 2 is a block diagram illustrating computers, methods and computer program products 200 that may be used as one or more of the computers 110a-d shown in FIG. 1 in accordance with embodiments of the present invention. The computer 200 typically includes input device(s) 202 such as a keyboard or keypad, a display 204, and a memory 206 that communicate with a processor 208 via an address/data bus 218. The processor 208 can be any commercially available or custom microprocessor. The computer 200 may further include a speaker 214, and I/O data ports 216 that also communicate with the processor 208. The I/O data ports 216 can be used to transfer information between the computer 200 and another computer, network, or device in a computer system. These components may be conventional components, such as those used in many conventional computers, which may be configured to operate as described herein.

The memory 206 is representative of the overall hierarchy of memory devices containing the software and data used to implement the functionality of the computer 200. The memory 206 can include, but is not limited to, the following types of devices: cache, ROM, PROM, EPROM, EEPROM, flash memory, SRAM, and DRAM. As shown in FIG. 2, the memory 206 may include several categories of software and data used in the computer 200: an operating system 222; application programs 224; input/output (I/O) device drivers 228; and data 226. As will be appreciated by those of skill in the art, the operating system 222 may be any operating system suitable for use with a computer, such as OS/2, AIX, System390 or Z/OS from International Business Machines Corporation, Armonk, N.Y., Windows95, Windows98, Windows2000 or WindowsXP from Microsoft Corporation, Redmond, Wash., Unix or Linux. The I/O device drivers 228 typically include software routines accessed through the operating system 222 by the application programs 224 to communicate with devices such as the I/O data port(s) 216 and certain memory 206 components. The application programs 224 are illustrative of the programs that implement the various features of the computer 200 and preferably include at least one application which supports operations according to embodiments of the present invention. Finally, the data 226 represents the static and dynamic data used by the application programs 224, the operating system 222, the I/O device drivers 228, and other software programs that may reside in the memory 206.

As is further seen in FIG. 2, the application programs 224 include a resource management system application 228. The resource management system application 228 performs the operations described herein for managing resources, including the hardware, software, and data, in the computer 200 and/or in other computers, networks, and/or components connected thereto.

The data portion 226 of memory 206, as shown in the embodiments of FIG. 2, includes an alert condition queue 234 and resource priority indications 238. Alert conditions that are identified by the computer 200 and/or that are communicated from other computers, networks, and/or components are placed in the alert condition queue 234. The resource priority indications 238 may include a table of resource identifiers and associated priorities. Alternatively or additionally, the resource priority indications 238 may include rules by which priorities indications may be determined for resources.

While the resource management system application 228 and the components of the data portion 226 of memory 206 are illustrated in FIG. 2 as being part of a single computer 200, according to some other embodiments of the present invention, the illustrated functionality and data may be distributed across one or more computers or other components in a computer system. For example, the functionality of the resource management system application 228 may be provided on one or more computers that are separate from the computer or component that includes the data 226. It will also be appreciated that various applications could be incorporated into the operating system 222 or some other logical division of the computer 200. Thus, the present invention should not be construed as limited to the configuration of FIG. 2, but is intended to encompass any arrangement, division of functions between computers and/or configuration capable of carrying out the operations described herein.

Figure 3:
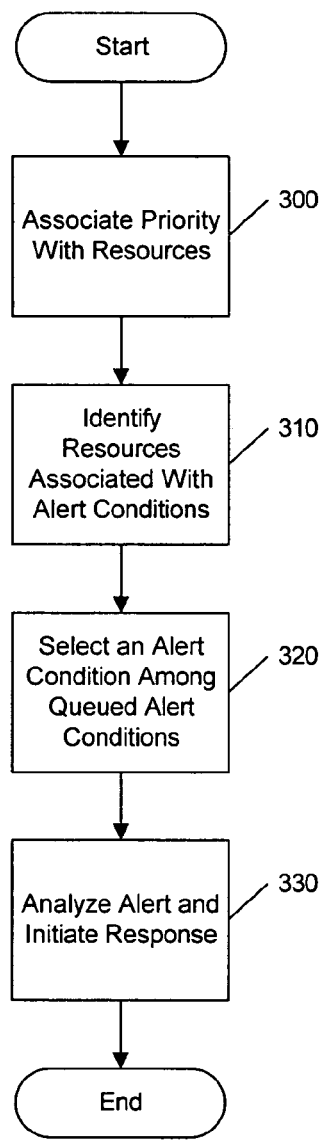
FIG. 3 is a flow chart diagram illustrating operations of methods, systems and computer program products for selecting among a plurality of alert conditions according to some embodiments of the present invention.

FIG. 3 illustrates operations for selecting among a plurality of alert conditions that may be in a queue for processing by a resource management system according to additional embodiments of the present invention. At Block 300, a priority indication is associated with resources. As explained above, the priority indications may form a table of resource identifiers and associated priorities and/or may include rules by which priorities may be determined for resources. A priority indication for a resource may be predefined by a user and/or it may be determined based on the relative importance of the resource to, for example, certain business operations, the affect of its failure on other resources, whether it associated with a server of information for other resources, and/or based on other attributes that may be predefined or determined for a resource.

At Block 310, the resources that are associated with the alert conditions are identified. As explained above, the resources may be identified based on, for example, information that is included in the alert condition and/or based on characteristics of the alert condition. At Block 320, an alert condition from among the alert conditions is selected based on the priority indication that is associated with the identified resources. For example, the alert queue can be examined to locate the first alert associated with a high priority resource. If multiple high priority resources have alerts in the queue, the alerts belonging to the highest priority resource is selected. When the resources have equal priority, the first alert in the queue from among the resources is selected.

At Block 330, a response is initiated for the selected alert condition. For example, the alert condition is examined to determine the error condition reported within the alert. The alert can be compared against other processed alerts in the system to detect if the current alert is a symptom of an already reported condition or if the alert is a root cause for other reported alerts. Responses may then be initiated locally on the resource management system or remotely on a computer or other resource identified within the alert to reconfigure, terminate, reinitialize or otherwise cause operations to be taken with respect to a resource(s) that is associated with the alert condition to remedy the problem. Regardless of whether the response is initiated locally or remotely, the alert may be displayed to a user, and may be prioritized relative to other alerts for display to a user and/or emphasized (e.g., highlighted, placing in an upper portion of a list, or otherwise displayed in a predetermined fashion) relative to other alerts that are displayed to a user. Alternatively or additionally, the initiated response can include prioritizing the selected alert condition relative to other alert conditions for processing for corrective action.

Figure 4:
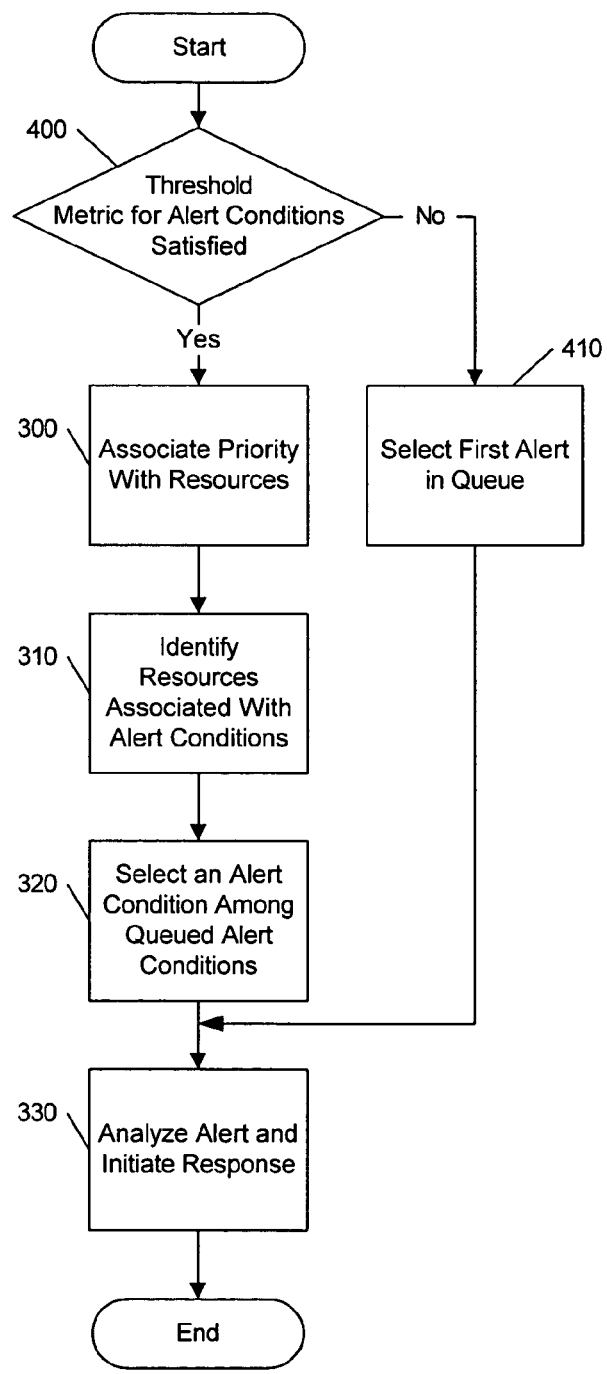
FIG. 4 is a flow chart diagram illustrating operations of methods, systems and computer program products for selecting among a plurality of alert conditions according to some other embodiments of the present invention.

FIG. 4 illustrates operations for selecting among a plurality of alert conditions according to some other embodiments of the present invention. As illustrated in FIG. 4, the operations for selecting among a plurality of alert conditions based on a priority indication are contingent upon a determination at Block 400 as to whether a threshold metric that is associated with at least some of the alert conditions has been satisfied. This determination may include determining when a threshold number of alert conditions are in a queue awaiting handling by a resource management system, determining when a threshold wait time has occurred between when alert conditions are queued and when they are handled by the resource management system, and/or determining when a threshold rate of alert conditions are received for handling by the resource management system. Accordingly, alert conditions may be, for example, handled in a first-come-first-served manner at Block 410 until a threshold metric is satisfied that indicates that the resource management system has become bogged-down, after which the alert conditions may be prioritized for handling, per Blocks 300-320.

The operation of Blocks 300-330 is the same as that described with regard to the same numbered blocks in FIG. 3, and will not be repeated here for brevity. As will be appreciated, the operations of Block 400 may occur after Block 300, Block 310, or Block 320.

While this invention has been particularly shown and described with reference to particular embodiments thereof, it will be understood by those skilled in the art that various changes in form and details may be made therein without departing from the spirit and scope of the invention as defined by the appended claims and equivalents.

That which is claimed is:

1. A method of selecting among a plurality of alert conditions for processing with a resource management system, the method comprising:

associating a priority indication with at least some physical resources in a computer system;

identifying the physical resources associated with the plurality of alert conditions; and selecting an alert condition from among the plurality of alert conditions based on the priority indication associated with the identified physical resources;

determining when a threshold metric associated with at least some of the plurality of alert conditions has been satisfied, wherein the selecting the alert condition from among the plurality of alert conditions based on the priority indication associated with the identified physical resources is carried out responsive to the determination that the threshold metric has been satisfied;

wherein said determining when a threshold metric associated with at least some of the plurality of alert conditions has been satisfied includes determining when a number of queued alert conditions for the resource management system satisfies a threshold number.

2. A method of selecting among a plurality of alert conditions for processing with a resource management system, the method comprising:

associating a priority indication with at least some physical resources in a computer system;

identifying the physical resources associated with the plurality of alert conditions; and selecting an alert condition from among the plurality of alert conditions based on the priority indication associated with the identified physical resources;

determining when a threshold metric associated with at least some of the plurality of alert conditions has been satisfied, wherein the selecting the alert condition from among the plurality of alert conditions based on the priority indication associated with the identified physical resources is carried out responsive to the determination that the threshold metric has been satisfied;

wherein said determining when a threshold metric associated with at least some of the plurality of alert conditions has been satisfied includes determining when a waiting time for alert conditions to be handled by the resource management system satisfies a threshold time.

3. A method of selecting among a plurality of alert conditions for processing with a resource management system, the method comprising:

associating a priority indication with at least some physical resources in a computer system;

identifying the physical resources associated with the plurality of alert conditions; and selecting an alert condition from among the plurality of alert conditions based on the priority indication associated with the identified physical resources;

determining when a threshold metric associated with at least some of the plurality of alert conditions has been satisfied, wherein the selecting the alert condition from among the plurality of alert conditions based on the priority indication associated with the identified physical resources is carried out responsive to the determination that the threshold metric has been satisfied;

wherein said determining when a threshold metric associated with at least some of the plurality of alert conditions has been satisfied includes determining when a threshold rate of alert conditions is received for the resource management system.

* * * * *